June 10, 1947.  H. A. BENZEL  2,421,866
COMPRESSOR FOR HYDRAULIC BRAKE UNITS AND THE LIKE
Filed Dec. 24, 1942  2 Sheets-Sheet 1
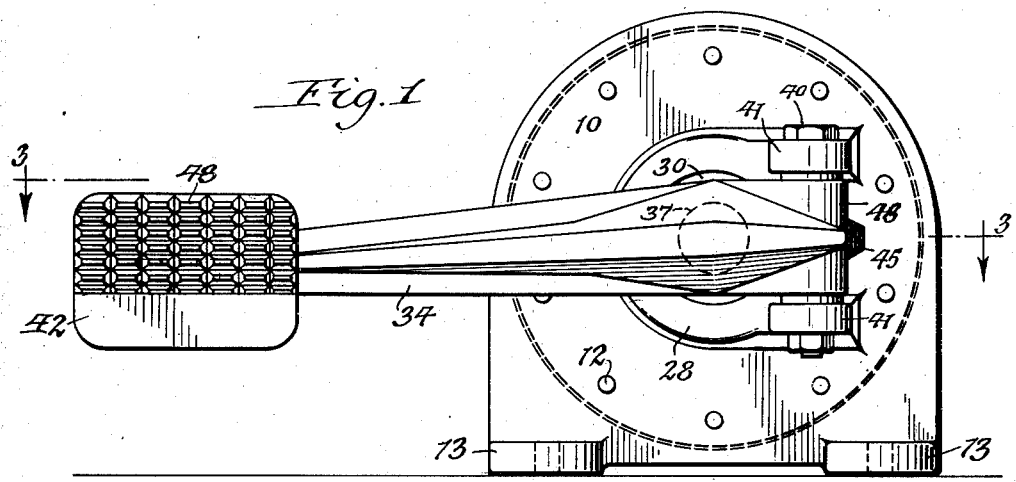
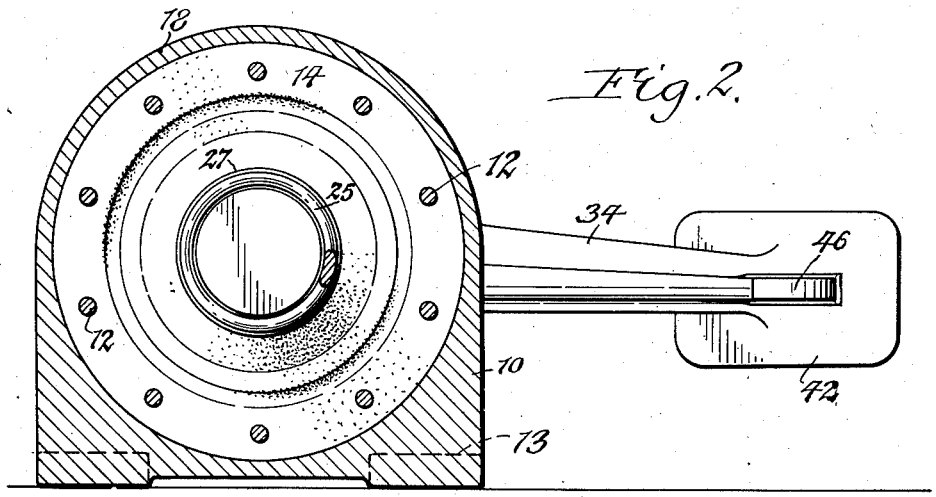
INVENTOR
Howard A. Benzel
BY
ATTORNEYS June 10, 1947.                H. A. BENZEL                2,421,866
        COMPRESSOR FOR HYDRAULIC BRAKE UNITS AND THE LIKE
                    Filed Dec. 24, 1942          2 Sheets-Sheet 2
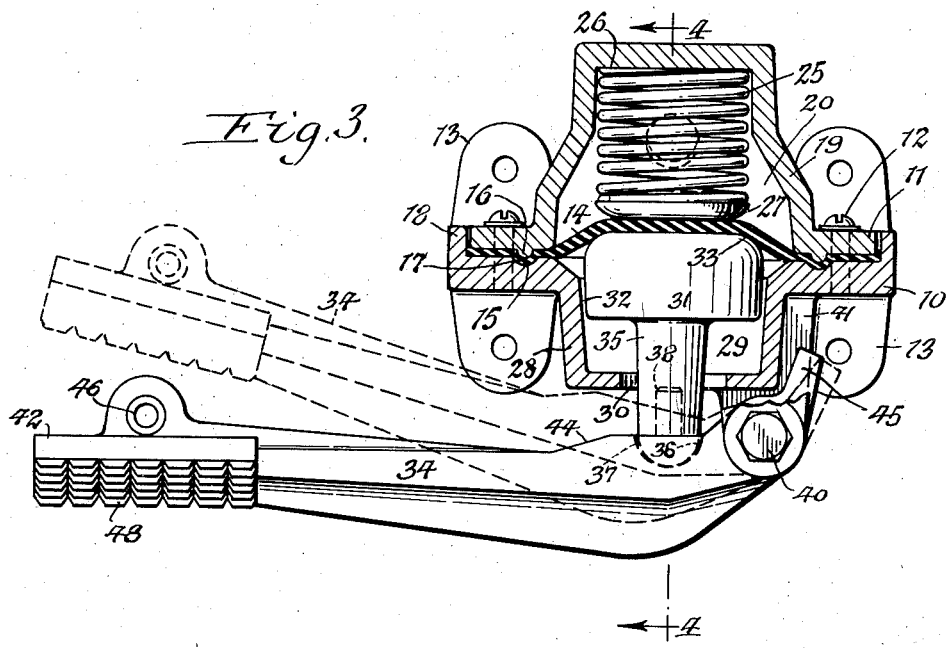
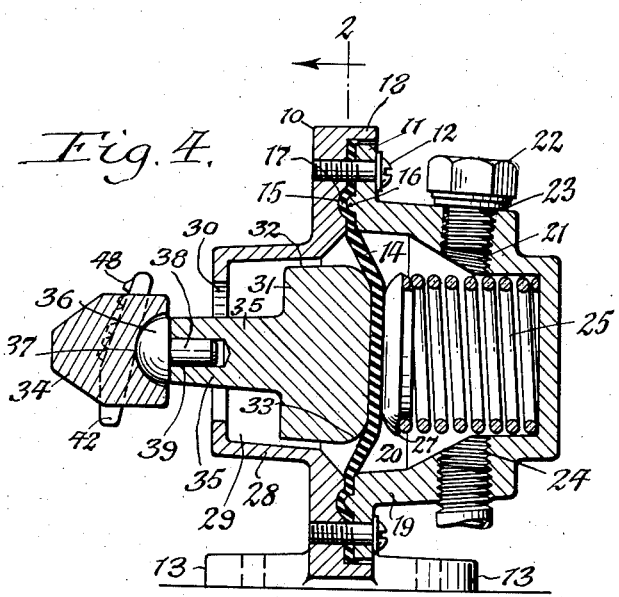
Howard A. Benzel INVENTOR
BY
ATTORNEYS Patented June 10, 1947

2,421,866

UNITED STATES PATENT OFFICE 2,421,866

COMPRESSOR FOR HYDRAULIC BRAKE UNITS AND THE LIKE

Howard A. Benzel, Marilla, N. Y., assignor to Scott Aviation Corporation, Lancaster, N. Y., a corporation of New York Application December 24, 1942, Serial No. 470,055

2 Claims. (Cl. 60—54.6)

1

This invention relates to a compressor which is more particularly intended for use as part of a hydraulic brake unit for controlling the movement of airplanes but the same may also be used for other purposes in which similar conditions exist.

The object of this invention is to improve the means for mounting the plunger of the apparatus relative to the parts associated therewith, also to improve the means for operating the plunger and also to design the several parts of the apparatus that the same can be manufactured expeditiously of high grade in quantities at low cost.

In the accompanying drawings:

Fig. 1 is a front elevation of a compressor embodying this invention.

Fig. 2 is a vertical cross section of the same, taken on line 2—2, Fig. 4, looking forwardly.

Fig. 3 is a horizontal longitudinal section, taken on line 3—3, Fig. 1, looking downwardly.

Fig. 4 is a vertical longitudinal section, taken on line 4—4, Fig. 3.

In the following description similar reference characters indicate like parts in the several figures of the drawings.

In general this compressor comprises a casing or hollow body which is associated with other parts to form a compression chamber adapted to contain a brake or power transmitting fluid or liquid and means whereby this fluid or liquid is expelled from this chamber for applying the brake member of the brake mechanism and also returning this brake fluid to this chamber for releasing the brake mechanism.

This casing preferably comprises front and rear sections 10, 11 having the general form of circular plates which are detachably connected at their corresponding edges by means of screws 12. This casing is installed in an airplane so that the same is arranged upright and extends crosswise of the cockpit of the airplane and the same is secured to the floor or other part of the airplane by means of screws entering the floor and passing through attaching lugs 13 on the lower portion of the front plate of the casing.

Between the opposing sides of the front and rear sections of the casing is arranged an upright flexible diaphragm 14 consisting preferably of a circular disk or sheet of rubber which is firmly secured around its entire edge or margin between the corresponding edges of the casing sections by the same screws 12 which connect these sections. The opposing bearing surfaces of the front and rear casing sections are provided with a complementary groove 15 and rib 16 which are pressed against opposite sides of the edge portion of the diaphragm so that those parts of the latter lying between the cooperating groove and rib will be deformed or bent into the shape of a bead 17, as shown in Figs. 3 and 4.

2

The front casing section is provided with a flange 18 which extends over the outer edge of the diaphragm and overlaps the adjacent edge portion of the rear casing section. The central part of the rear casing section is provided with a rearwardly projecting breast or bulge 19 the inner side of which is hollowed and forms a fluid compression chamber 20 the front side of which is closed by the flexible diaphragm.

A power transmitting liquid of any suitable character is introduced into the compression chamber through a filling opening 21 in the upper part of the bulge which opening is normally closed by a screw plug 22, a gasket or packing ring 23 being interposed between the head of this screw and said bulge, as shown in Fig. 4. When this liquid is subjected to pressure the same is expelled therefrom through an outlet opening 24 in the bottom of the chamber 20 for operating parts remote from the compressor such as the brake shoe or retarding member of an airplane brake system.

Resilient means, such as a helical spring 25, are provided whereby the diaphragm is moved forwardly for returning the brake fluid from the brake mechanism to the compression chamber upon releasing the brake system. This spring is arranged horizontally in the central part of the compression chamber and has its rear end seated on the bottom of a forwardly opening pocket 26 formed centrally on the bulge 19 while its front end presses against the central part of the rear side of the diaphragm through the medium of a pad 27 interposed between this spring and the diaphragm.

Manually operated means are provided whereby the aviator can deflect the central part of the diaphragm rearwardly for expelling the fluid from the compression chamber.

The means for accomplishing this purpose include a horizontally elongated tubular neck 28 projecting forwardly from the front casing section and containing a guide pocket 29 which opens at its rear end toward the diaphragm and is provided at its front end with an opening 30. The bore of this neck is of forwardly tapering conical form. Within this guide pocket is arranged a plunger or piston 31 which is movable horizontally forwardly and backwardly and bears with its rear or inner side against the front or outer side of the diaphragm. The side 32 of this plunger is of substantially cylindrical form in cross section and normally clears the bore of the neck but when assembling the parts of the apparatus the periphery of the plunger, while in its foremost position, engages the bore of the tubular neck and thus serves to center the plunger in the front casing section preparatory to engaging the central part of the diaphragm with the rear end of the plunger. The plunger is provided with a convex or rounded rear end 33 which bears against the front side of the diaphragm. Upon moving this plunger rearwardly its convex surface bears against the central part of the diaphragm and causes the same to be deflected rearwardly in the compression chamber and displaces the fluid therein. In Figs. 3 and 4 the plunger has effected part of its rearward stroke and deflected the diaphragm accordingly.

The plunger is preferably actuated by a foot operated lever 34 which is preferably made of metal arranged horizontally and lengthwise in front of the central part of the casing and operatively connected with the plunger and pivotally mounted on the casing.

The connection between the plunger and the operating lever embodies a feature of this invention and is constructed as follows:

The numeral 35 represents a stem projecting forwardly from the central part of the plunger and through the opening 30 in the front end of the neck 28. This stem engage the operating lever by means of a ball and socket joint consisting preferably of a semi-spherical socket 36 formed on the rear side of the operating lever, a semi-spherical ball 37 preferably made of metal engaging its convex side with this socket and a pin 38 projecting rearwardly from the rear side of this ball and fitting in a recess 39 in the front end of the plunger stem, as shown in Figs. 3 and 4.

Upon moving the operating lever backwardly and forwardly the plunger is actuated for deflecting and relaxing the diaphragm and causing the power transmitting fluid to be discharged from the compression chamber and returned thereto.

During this operation the ball 37 rocks in the socket 36 of the spherical joint between them due to the differences in the lines of movement of the oscillating operating lever and the reciprocating plunger, thereby avoiding any cramping action during such operation. In order to insure still greater freedom of movement of the operating lever and plunger without causing binding between the same the radius of the spherical surface of the socket 36 is slightly larger than the radius of the spherical surface of the ball 37, as shown in Figs. 3 and 4, thereby providing the desired clearance between these surfaces for this purpose.

At one of its ends the operating lever is pivoted on the casing by means of a vertical hub 43 formed on the respective end of the lever and arranged between two bearing lugs 41 projecting forwardly from the upper and lower parts of the front casing section, and a pivot bolt 40 passing through said bearing lugs and the hub of the operating lever.

At its free end the operating lever is provided with a pedal 42 which is preferably provided with serrations 48 so that the aviator's foot when pressing rearwardly against the same for deflecting the diaphragm will not be liable to slip therefrom.

Rearward movement of the foot lever 34 is limited by stop means consisting preferably of a stop face or shoulder 44 formed on the rear side of the lever and adapted to engage with the adjacent stop part of the neck 28, as shown in Fig. 3. Forward movement of the operating lever is limited by a stop lug or tail 45 which projects laterally from the hub of the lever on the opposite side of its axis and is adapted to engage with the adjacent part of the casing neck 28.

It will now be clear that upon moving the foot lever backwardly the plunger or piston 31 will deflect the central part of the diaphragm rearwardly and thus force fluid out of the compression chamber to the place where the same is utilized and when removing the rearward pressure on this lever the spring 25 will move the plunger, diaphragm and associated parts forwardly, thereby drawing the power transmitting fluid from the place where it was used back into the compression chamber, preparatory to being again expelled therefrom during the next application of the brakes or other mechanism.

In order to permit of operating the compressor from a place in rear of the casing instead of in front of the same, the free end of the operating lever is provided on its rear side with a coupling eye 46 to which a rod, or other motion means, may be connected and thus render the compressor operative from different places on the airplane.

This compressor is not only simple in construction and efficient in operation but the same can also be produced economically and readily maintained in good working condition.

I claim as my invention:

1. A fluid compressor, comprising a front casing section having a forwardly projecting hollow neck the bore of which is of forwardly tapering form, a rear casing section having a fluid inlet and outlet, a flexible diaphragm having its marginal edge secured between said casing sections and forming with said rear casing section a pressure chamber, a plunger arranged within the front casing section and neck and engaging said diaphragm and having a forwardly tapering periphery, and an operating lever engaging said plunger.

2. A fluid compressor, comprising a front casing section having a forwardly projecting hollow neck the bore of which is of forwardly tapering conical form, a rear casing section having a fluid inlet and outlet, a flexible diaphragm having its marginal edge secured between said casing sections and which forms a fluid pressure chamber with said rear casing section, a spring interposed between said diaphragm and rear casing section, a plunger arranged with said front casing section and neck and engaging its rear end with said diaphragm, and an operating lever connected with the front end of said plunger, said plunger when disconnected from said lever being moved forwardly by said spring and centered in said neck by engagement of the periphery of said plunger with the tapering bore of said neck.

HOWARD A. BENZEL.

REFERENCES CITED

The following references are of record in the file of this patent:

UNITED STATES PATENTS

| Number | Name | Date |
|---|---|---|
| 1,758,671 | Loughead | May 13, 1930 |
| 1,776,288 | Livingston | Sept. 23, 1930 |
| 1,786,438 | Linderman | Dec. 30, 1930 |
| 1,997,100 | Boughton | Apr. 9, 1935 |
| 2,002,798 | Renholdt | May 28, 1935 |
| 2,070,298 | Schnell | Feb. 9, 1937 |
| 2,072,693 | Volkert | Mar. 2, 1937 |
| 2,185,277 | Stelzer | Jan. 2, 1940 |
| 2,243,464 | Kucher | May 27, 1941 |
| 2,343,788 | Moran | Mar. 7, 1944 |